United States Patent [19]

Miyakawa et al.

[11] Patent Number: 5,343,655
[45] Date of Patent: Sep. 6, 1994

[54] WEATHER STRIP FOR THE WINDOW GLASS OF AN AUTOMOBILE

[75] Inventors: Naohisa Miyakawa, Inba; Minoru Masuzawa, Kashiwa; Katsuhisa Kato, Kitasouma, all of Japan

[73] Assignees: Tokiwa Chemical Industries Co., Ltd.; Masuzawa Chemical Sales Co., Ltd., both of Chiba; System Technical Co., Ltd., Ibaragi, all of Japan

[21] Appl. No.: 968,153

[22] Filed: Oct. 27, 1992

[51] Int. Cl.[5] .................................. E06B 7/16
[52] U.S. Cl. ............................. 49/441; 49/377; 49/475.1; 264/177.2; 264/211
[58] Field of Search ............... 49/441, 377, 475.1; 264/177.2, 211

[56] References Cited

U.S. PATENT DOCUMENTS

| | | |
|---|---|---|
| 2,908,028 | 10/1959 | Runton et al. |
| 3,685,206 | 8/1972 | Kessler .................. 49/475.1 X |
| 3,897,967 | 8/1975 | Barenyi |
| 3,918,206 | 11/1975 | Dochnahl |
| 3,927,493 | 12/1975 | Tsuneishi et al. |
| 4,275,099 | 6/1981 | Dani |
| 4,314,872 | 2/1982 | Schiesser |
| 4,351,868 | 9/1982 | Otani |
| 4,360,549 | 11/1982 | Ozawa et al. |
| 4,442,156 | 4/1984 | Yamaguchi |
| 4,643,923 | 2/1987 | Bernitz et al. |
| 4,668,543 | 5/1987 | Schlenz |
| 4,698,193 | 10/1987 | Bernitz et al. |
| 4,897,298 | 1/1990 | Otawa et al. ............ 49/441 X |
| 4,923,759 | 5/1990 | Brooks et al. ........... 49/441 X |
| 4,929,490 | 5/1990 | Iwasa |
| 4,969,293 | 11/1990 | Guillon ................... 49/441 |
| 5,005,317 | 4/1991 | Saint-Louis Augustin et al. ......................... 49/377 X |
| 5,013,379 | 5/1991 | Brooks et al. |
| 5,014,464 | 5/1991 | Dupuy et al. |
| 5,042,201 | 8/1991 | Vaughn .................. 49/441 X |
| 5,044,684 | 9/1991 | Yada |
| 5,125,185 | 6/1992 | Shiota et al. ............ 49/377 |
| 5,136,773 | 8/1992 | Mesnel et al. |
| 5,183,613 | 2/1993 | Edwards |

FOREIGN PATENT DOCUMENTS

| | | |
|---|---|---|
| 0209453 | 1/1987 | European Pat. Off. |
| 0372745 | 6/1990 | European Pat. Off. |
| 54-107963 | 8/1979 | Japan |
| 57-61543 | 4/1982 | Japan |
| 58-22148 | 2/1983 | Japan |
| 59-201838 | 11/1984 | Japan |
| 61-2085 | 1/1986 | Japan |
| 62-255217 | 11/1987 | Japan |
| 135740 | 7/1989 | Japan |
| 1-249513 | 10/1989 | Japan |
| 2-76716 | 3/1990 | Japan |
| 2220969 | 1/1990 | United Kingdom |

*Primary Examiner*—Philip C. Kannan
*Attorney, Agent, or Firm*—Wenderoth, Lind & Ponack

[57] ABSTRACT

A weather strip allowing the opening and closing operations of the window glass in a door of automobile to be performed is formed by a base portion made of a hard synthetic resin, a support portion made of a soft synthetic resin and a contacting band layer comprising two synthetic resins of different melting points, of which powder or particles of the synthetic resin of a high melting point are mixed with the synthetic resin of a low melting point. The contacting band layers are provided on the portions of the base portion and support portion where the window glass abuts. The contacting band layer is formed by extrusion simultaneously with the extrusion of the base portion and support portion, whereby a rough face is integrally formed on the surface of the contacting band layer.

8 Claims, 4 Drawing Sheets

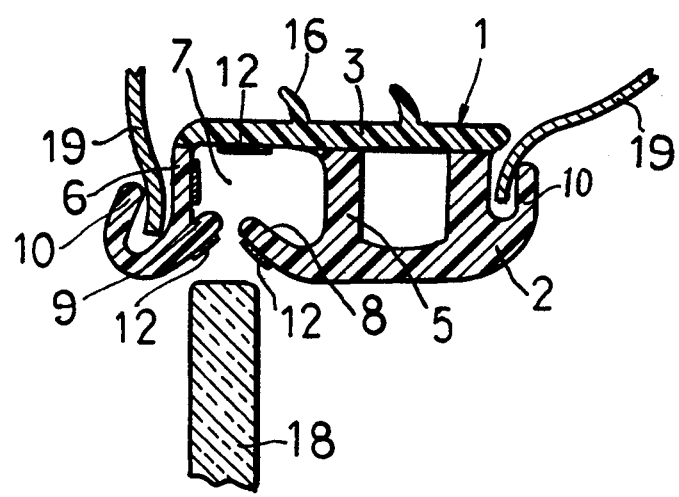
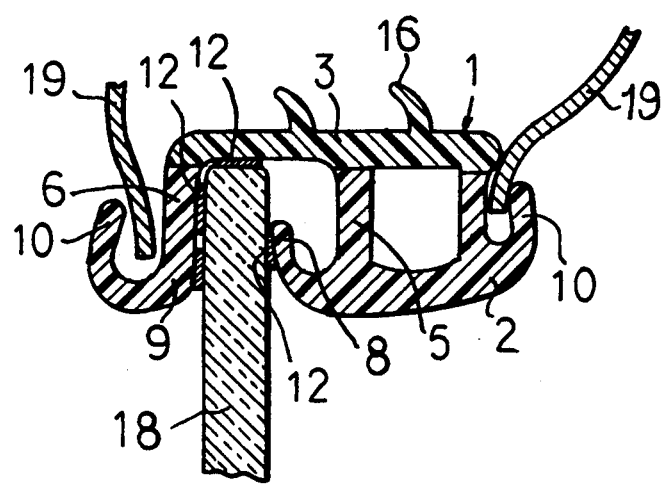

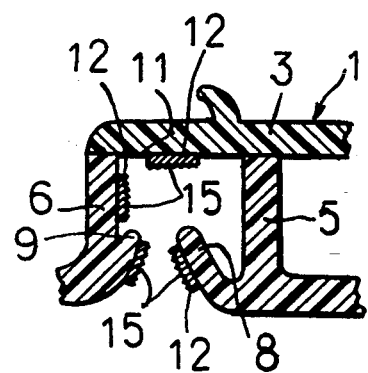
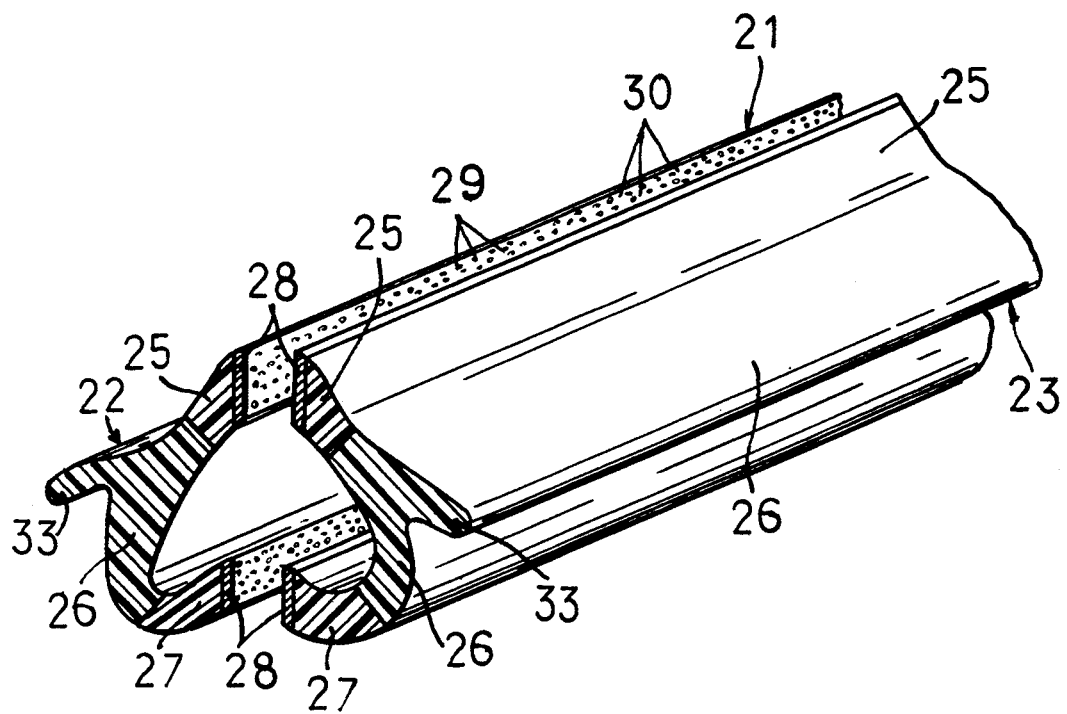

WEATHER STRIP FOR THE WINDOW GLASS OF AN AUTOMOBILE

BACKGROUND OF THE INVENTION

1. Field of the Invention

This invention relates to a weather strip for the window glass of an automobile which enables the window glass to be lightly and smoothly opened and closed in a door of the automobile and to surely prevent the intrusion of rain water through the window.

2. Description of the Prior Art

Conventionally, this type of window glass in the door of an automobile is opened and closed often for ventilation of a compartment of the automobile. Consequently, the operation of opening and closing the window glass should be conducted in a very light way, and the window glass needs to be water tight.

Thus, in order to lightly and smoothly open and close the window glass, the conventionally known weather strip for the window glass of an automobile is generally formed by a soft synthetic resin or synthetic rubber. Further, it is known that the weather strip for a window glass is provided with a fiber nap such as a nylon nap on the contact surface where the window glass abuts. There exists also a conventional weather strip for the window glass in which a fluorine synthetic resin tape including molybdenum is attached by adhesives to the contact surface where the window glass abuts.

However, the conventional weather strip produced by a soft component such as synthetic resin or synthetic rubber has the drawback of an inconvenient opening and closing operation as well as difficulty in rigidly securing it to a door panel, as the open and close operation is heavy and a large force is loaded on the window glass for a strong pressure at the time of the opening and closing operation of the window glass, although the weather strip is tightly pressed against the window glass and has excellent of water tightness.

Furthermore, the known weather strip that is provided with the fiber nap such as a nylon nap on the contact surface where the window glass abuts is suitable for the contact and separation conditions with and from the window glass. The window can be easily operated to smoothly open and close the window glass, but the fiber napping process is very complicated, and after numerous uses, the implanted fiber nap is easily removed or worn away, wherein rain water intrudes into the compartment of the automobile.

The known weather strip having the synthetic resin tape has a drawback in that it needs a complicated process to coat the adhesive in order to attach the synthetic resin tape with the adhesive and complicated work to attach the tape inside the weather strip into which the window glass is inserted and on portions such as a curved surface and a corner surface.

SUMMARY OF THE INVENTION

It is a main object of the invention to provide a weather strip for the window glass of an automobile which can be securely fixed to the door panel and which enables the door window glass to be lightly opened and closed without resistance and to smoothly conduct contact and separation with and from the window glass over a long time and to provide excellent water tightness.

The weather strip for the window glass of an automobile according to this invention comprises a base portion mounted to the door panel formed by a hard synthetic resin. A support portion supports the window glass and is formed by a soft synthetic resin. A contacting band layer is provided on the contacting portions of the base portion and support portion where the window glass abuts and comprises two synthetic resins of different melting points. Powders or particles of the synthetic resin of a high melting point are mixed into the synthetic resin of a low melting point. A rough surface is formed on the surface of the contacting band layer by extruding it simultaneously with the base portion of hard synthetic resin and the support portion of soft synthetic resin.

The contacting band layer in the weather strip for the window glass of an automobile according to this invention is formed by two synthetic resins of different melting points. Powder or particles of a synthetic resin, such as nylon, urethane, polyolefin resin and polystyrene resin of a high melting point, are mixed with a material such as nylon, urethane, polyolefin resin and polystyrene resin of a low melting point.

The low melting point material in the two synthetic resin mixture forming the contacting band layer in the weather strip may include 12-nylon, 11-nylon, polyolefin resin and polystyrene resin, and the high melting point material may include 6-nylon, 66-nylon, flourine resin, polyolefin resin and polystyrene resin.

BRIEF DESCRIPTION OF THE ACCOMPANYING DRAWINGS

FIG. 1 a perspective view showing a weather strip according to this invention used for an automobile.

FIG. 3 is an enlarged vertical section view of the upper weather strip along line A—A in FIG. 1 in the open state of a window.

FIG. 4 is an enlarged vertical section view of the upper weather strip along line A—A in FIG. 1 in the closed state of the window.

FIG. 5 is a partial vertical section view of the upper weather strip.

FIG. 6 is a perspective view of a lower weather strip.

DESCRIPTION OF THE PREFERRED EMBODIMENTS

Figure 1:
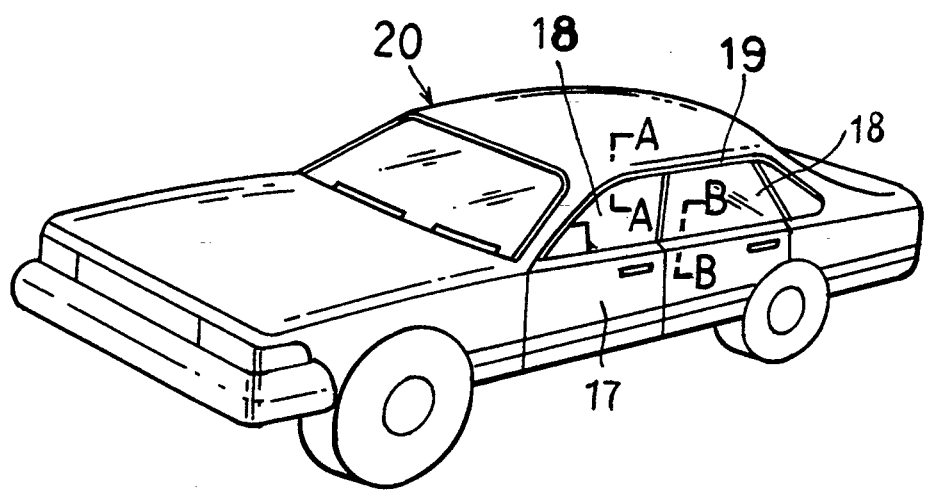
Figure 2:
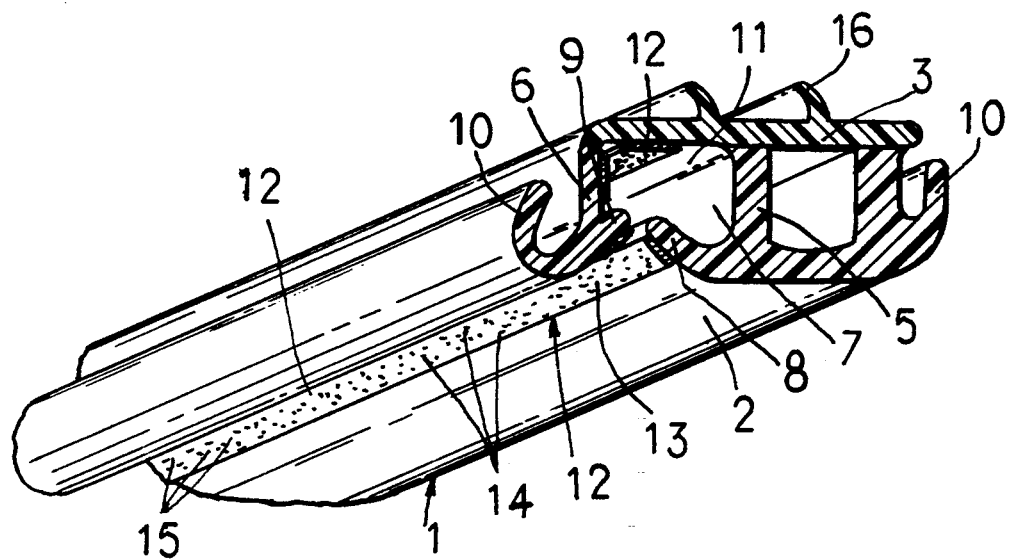
FIG. 2 is a perspective view of an upper weather strip.

An embodiment of an upper weather strip for the window glass of automobile according to this invention will be hereinafter described in detail with reference to FIGS. 1–5.

An upper weather strip 1 is arranged to be fixed to a receiving frame of a door panel 19 so that a window glass 18 is slidable with less sliding resistance to open and close the window glass 18 in a door 17 provided on an automobile 20. The upper weather strip 1 comprises a base portion 3 of hard synthetic resin to be mounted on the door panel 19, and a supported portion 2 of soft synthetic resin to be pressed and held at the window glass 19. The base portion 3 made of hard synthetic resin and the support portion 2 made of soft synthetic resin are integrally extruded.

The base portion 3 is provided with a plurality of mounting projections 16 at an outer portion for fixing it to the door panel 19. Each of the projections 16 may be formed in various shapes.

The support portion 2 is provided with an upright piece 5 and an upright piece 6 made of soft synthetic resin and standing upright from the base 3. An insertion groove 7 for inserting the window glass 18 is formed by the upright piece 5 and the upright piece 6 and the base portion 3. The upright pieces 5 and 6 are provided, at opposed positions in the entrance of the groove 7, with respective pressing tangs 8 and 9.

Contacting band layers 12, having low friction, are provided on an inner face 11 of the insertion groove 7, where the window glass 18 is pressed in the closed state of the window glass 18, and on the surfaces of the tangs 8 and 9 where the window glass 18 is pressed. The contacting band layer 12 comprises two materials of different melting points, such as nylon, urethane, polyolefin system resin and polystyrene resin, and is formed by a synthetic resin 13 having powder or particles 14 of a material of a high melting point mixed with a material of a low melting point. The contacting band face 12 is extruded simultaneously with the extrusion of the supporter portion 2 and the base portion 3, whereby a rough face 15 is formed on the surface of the contact band layer 12. Reference numeral 10 denotes a bending clip piece, provided on both sides of the upper weather strip 1 to clip on the door panel 19.

Figure 7:
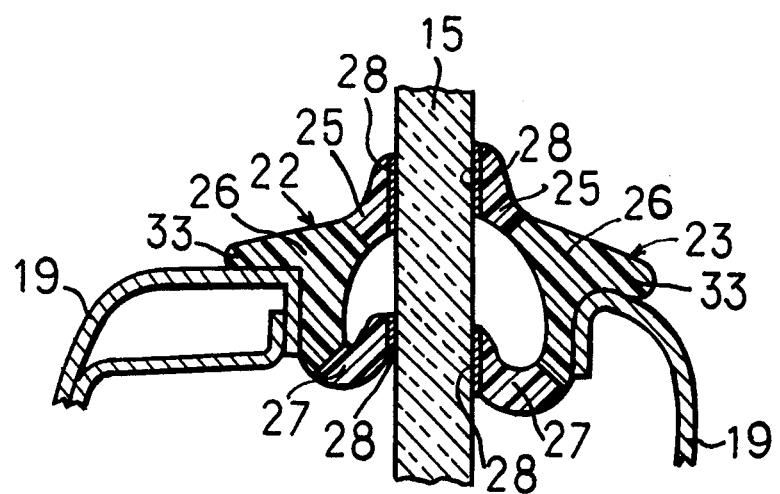
FIG. 7 is an enlarged vertical section view of the lower weather strip along line B—B in FIG. 1.
Figure 8:
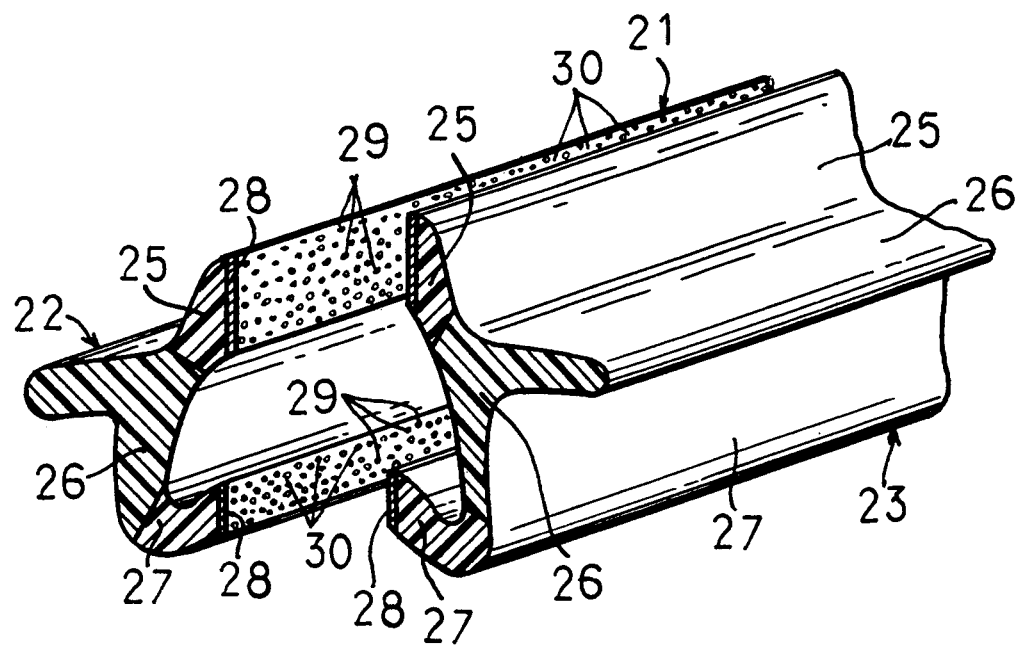
FIG. 8 is a perspective view similar to FIG. 6 showing lip portions of the lower weather strip placed at a distance.

An embodiment of a lower weather strip will be described hereinafter with reference to FIG. 6–8. A lower weather strip 21 for pressing the window glass 18 in the opening of the door 17 of the automobile 20 from the inside and outside comprises opposed strips 22 and 23 opposed to each other and formed by extruding synthetic resins in the longitudinal direction.

Each of the strips 22 and 23 is provided at its intermediate portion with a base portion 26 made of a hard synthetic resin. At the upper end and lower end of the base portions 26 are an upper support portion 25 and a lower support portion 27, made of soft synthetic resin, respectively.

A contacting band layer 28, having low friction, is provided on a surface where each of the upper supports 25 and lower supports 27 contact the window glass 18, and comprises synthetic resins having powder or particles 29 of nylon, urethane, polyolefin resin and polystyrene resin with a compatible meltability and a high melting point mixed with a material of low melting point of nylon, urethane, polyolefin resin and polystyrene resin. The contacting band layer 28 is formed by extruding it simultaneously with the extrusion of the support portions 25 and 27 made of soft synthetic resin and the base portion 26 made of hard synthetic resin, whereby a rough face 30 is formed on the surface of the contacting band layer 28.

The base portions 26, made of hard synthetic resin, are integrally formed with engaging flanges 33 to be mounted on the door panel 19.

The synthetic resins for forming the contacting band layers 12 and 28 utilize 12-nylon, 11-nylon, polyolefin resin and polystyrene resin as the material of a low melting point, and use 6-nylon, 66-nylon, fluorine resin, polyolefin resin and polystyrene resin as the material of a high melting point.

The weather strip for a window glass of an automobile according to this invention can be rigidly fixed to the door panel and can be prevented from vibration and movement, as the base portion is formed by hard synthetic resin, and as the support portion is formed by soft synthetic resin and is integrally formed with the base portion. The window glass then contacts tightly with the support portion without difficulty and conveniently when opening and closing the window glass, and is lightly slidable with a low friction resistance, whereby there exists no gap between the window glass and the weather strip and thus enables the accomplishment of perfect water tightness. Further, since the contacting band layer comprises the synthetic resins having powder or particles of materials of a high melting point mixed with materials of a low melting point, and is formed integrally by extrusion with the base portion and the support portion, the synthetic resin of a low melting point is surely molten, and the powder or particles of the synthetic resin of a high melting point are not molten, and remain on the surface, thereby easily forming concaves and convexes to surely form a rough surface on the surface of the contacting band layer. As the contacting band layer is extruded simultaneously with the base portion and the support portion, they are surely moltenly bonded and are not easily peeled off from each other, providing overall strength.

We claim:

1. A weather strip for a window glass, comprising:
   a base portion comprising a hard synthetic resin;
   a support portion for supporting the window glass, said support portion being connected with said base portion and comprising a soft synthetic resin; and
   a contacting band layer disposed on at least said support portion for contacting the window glass, said contacting band layer comprising two synthetic resins having different melting points, including a first synthetic resin having a high melting point and a second synthetic resin having a low melting point, and wherein said first synthetic resin is mixed with said second synthetic resin such that said contacting band layer has an integral rough surface.

2. The weather strip of claim 1, wherein said first synthetic resin is selected from the group consisting of a high melting point nylon, urethane, polyolefin resin and polstyrene resin, and said second synthetic resin is selected from the group consisting of a low melting point nylon, urethane, polyolefin resin and polystyrene resin.

3. The weather strip of claim 1, wherein said second synthetic resin is selected from the group consisting of a 12-nylon, 11-nylon, polyolefin resin and polystyrene resin, and said first synthetic resin is selected from the group consisting ob 6-nylon, 66-nylon, flourine resin, polyolefin resin and polystyrene resin.

4. A weather strip for a window glass, comprising:
   a base portion comprising a first synthetic resin;
   a support portion connected to said base portion and comprising a second synthetic resin, wherein said second synthetic resin is softer than said first synthetic resin; and
   a contacting band layer disposed on at least said support portion, said contacting band layer comprising a third synthetic resin having a relatively high melting point mixed with a fourth synthetic resin having a relatively low melting point such that said contacting band layer has an integral rough surface.

5. The weather strip of claim 4, wherein said third synthetic resin is selected from the group consisting of a high melting point nylon, urethane, polyolefin resin and polystyrene resin, and said synthetic fourth resin is selected from the group consisting of a low melting point nylon, urethane, polyolefin resin and polystyrene resin.

6. The weather strip of claim 4, wherein said fourth synthetic resin is selected from the group consisting of a 12-nylon, 11-nylon, polyolefin resin and polystyrene resin, and said first synthetic resin is selected from the group consisting of 6-nylon, 66-nylon, flourine resin, polyolefin resin and polystyrene resin.

7. The weather strip of claim 4, and further comprising a second support portion connected to said base portion comprising said second synthetic resin and having a said contacting band layer thereon, wherein the first said support portion and said second support portion are spaced apart on said base defining a insertion groove therebetween together with said base, and wherein said base has a further said contacting band layer thereon.

8. The weather strip of claim 4, wherein said weather strip has an integral form resulting from extruding said base portion, said support portion and said contacting band layer simultaneously.

* * * * *